Nov. 4, 1924.  1,514,019

F. SKATULSKI

TIRE CHANGING TOOL

Filed April 4, 1923   2 Sheets-Sheet 1

Inventor
Frank Skatulski.
By Lancaster and Allwine
Attorneys

Nov. 4, 1924.
F. SKATULSKI
1,514,019
TIRE CHANGING TOOL
Filed April 4, 1923     2 Sheets-Sheet 2
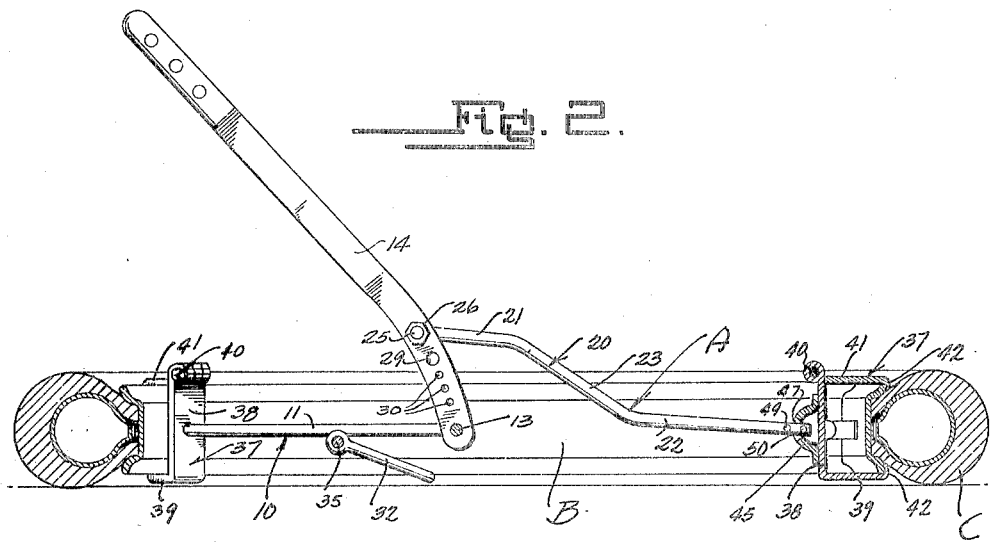
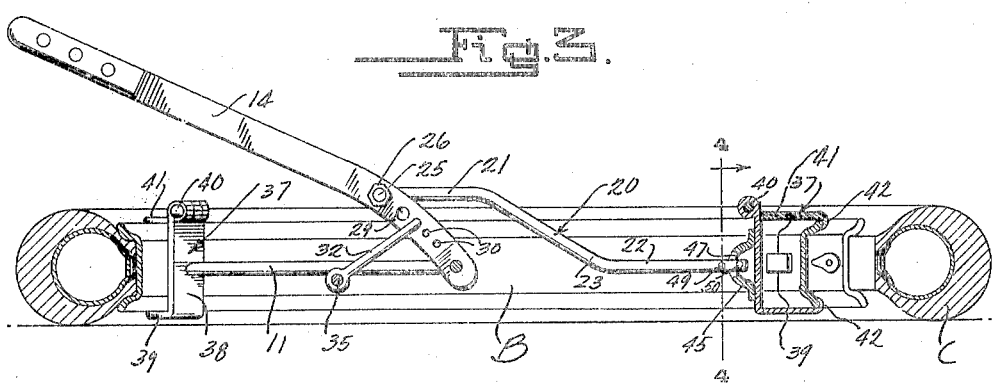
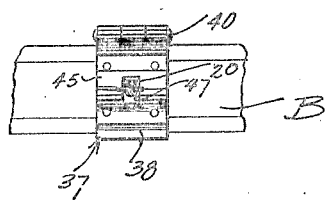
Inventor
Frank Skatulski.
By Lancaster Allwine
Attorney Patented Nov. 4, 1924.

1,514,019

UNITED STATES PATENT OFFICE.

FRANK SKATULSKI, OF DETROIT, MICHIGAN.

TIRE-CHANGING TOOL.

Application filed April 4, 1923. Serial No. 629,834.

*To all whom it may concern:*

Be it known that I, FRANK SKATULSKI, a citizen of the United States, residing at Detroit, in the county of Wayne and State of Michigan, have invented certain new and useful Improvements in Tire-Changing Tools, of which the following is a specification.

This invention relates to improvements in tire removing and placing tools.

The primary object of this invention is the provision of a tire rim contracting and expanding tool, by means of which a tire rim may be most effectively handled during a tire placing or removing operation.

A further object of this invention is the provision of a novel rim tool for vehicle wheels, of compact formation, and embodying means whereby the same may be held in position with a rim contracted so that a tire may be readily removed or replaced with respect thereto.

A further object of this invention is the provision of a novel type of rim engaging jaw for tire removing tools.

Other objects and advantages of this invention will be apparent during the course of the following detailed description.

In the accompanying drawings, forming a part of this specification, and wherein similar reference characters designate corresponding parts throughout the several views.

Figure 2 is a cross sectional view taken through the improved rim tool, showing the same in position upon a rim, just prior to contraction of the latter for removing a tire therefrom.

Figure 3 is a cross sectional view, showing details analogous to those illustrated in Figure 2, with the improved tool parts in such position as to contract the rim of a vehicle wheel so that a tire may be easily removed therefrom.

Figure 4 is a cross sectional view, taken substantially on the line 4—4 of Figure 3.

Figure 1:
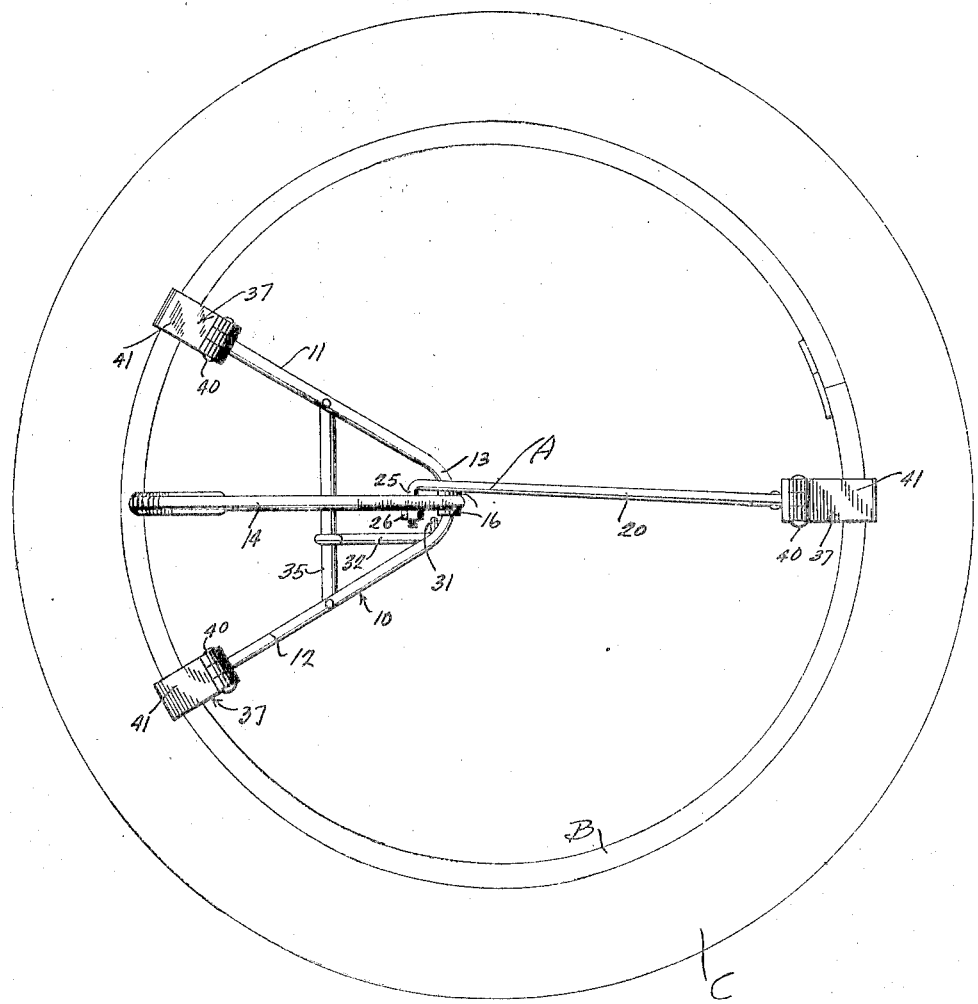
Figure 1 is a plan view of the improved rim contracting or expanding tool, showing the application of the same upon a vehicle wheel.

In the drawings, wherein for the purpose of illustration is shown but the preferred embodiment of this invention, the letter A may generally designate the improved rim tool, adapted for direct operation upon the rim B of the vehicle wheel, so that the same may be contracted or expanded for the mounting or removal of the tire C.

Referring to the improved tire removing or replacing tool A, the same includes a substantially V-shaped member 10, which is preferably formed of a single length of material, bent intermediate its ends to provide relatively straight arms 11 and 12 in diverging relation. At the bight portion 13 of the V-shaped member 10, an operation lever 14 is pivotally connected, intermediate the annular retaining flanges 16 formed upon said bight portion 13; said operating lever 13 being positioned for oscillation in a plane at right angles to the plane defined by the V-shaped member 10.

A link or arm member 20 is preferably provided, having the ends 21 and 22 thereof offset by an intermediate portion 23, as to lie in substantially parallel relation. The extreme end of the portion 21 is bent, as at 25, at right angles thereto, and is preferably screw threaded for detachably receiving a nut 26. This bent portion 25 is adapted for selective disposal for bearing purposes, within any of a series of apertures 29 provided along the lever 14. The arm 20 is thus pivotally connected to the lever 14 intermediate its ends, and at a predetermined distance with respect to the pivotal mounting of the lever 14 upon the V-shaped member 10. Intermediate these pivotal connections of the lever 14, a series of relatively small openings 30 are provided, longitudinally of the lever 14, which are adapted for receiving the inturned end 31 of a latch arm 32, which is pivoted at its opposite end upon a cross bar 35, extending transversely for rigid connection at its ends to the arms 11 and 12 of the V-shaped member 10, and intermediate the ends of said bar.

At their free ends, the arms 11 and 12 of the V-shaped member 10, and at the free end of the arms 20, novel rim engaging jaws 37 are provided, which are similar in structure. Each of these jaws preferably includes a substantially rectangular flat plate or base portion 38, having at one end thereof a side or rim gripping flange 39 rigid therewith. At its other end, the supporting plate 38 pivotally receives as by means of a pintle 40, a rim engaging member 41, which forms the opposite side of the jaw 37, and may pivotally swing toward or away from the other side 39. At their free edges, the sides 39 and 41 are provided with the inturned rim hooks 42.

As to the placement of the jaws 37 upon the various arms of the improved rim expanding and contracting tool A, jaws 37 are rigidly positioned upon the free end of each of the arms 11 and 12, as by having the free ends of said arms riveted, welded or otherwise connected to the base plate 38 of said jaws, substantially at the central point. As to the other arm 20, the rim jaw 37 thereof is pivoted thereto in a novel manner. This pivot construction preferably includes a socket plate 45, segmental in formation, which may be welded or otherwise secured to the outside surface of the base or supporting plate 38 as to outstand therefrom. At its outstanding portion, this socket element 45 is provided with an elongated slot 47, into which the free end of the arm 20 may extend. Transverse pins 49 and 50 may be carried by this free end portion of the arm or link 20, respectively engaging the socket member 45, exteriorly and interiorly thereof, so that the arm 20 and its jaw 37 may be relatively oscillatively moved.

In operation, to contract a rim, the device is arranged within the rim so that the rigid sides 39 of the jaws 37 may engage the rim adjacent the ground or supporting floor or surface upon which the rim is positioned, the hinged hooks 41 are then properly positioned to engage the opposite side of the rim. The clamps 37 carried by the V-shaped member 10 are disposed diametrically opposite to the clamp 37 upon the free end of the pivotal arm 20, and the latter clamp or jaw engages the rim adjacent the split. When the operator engages the lever 14 to move the same toward the V-shaped frame or member 10, it is obvious that the arms of the improved rim tool A will be relatively moved with respect to each other, and as the jaws 37 securely engage the rim it is obvious that the rim will be contracted, so that a tire may be removed or placed with respect thereto. To hold the rim tool A in position with the rim contracted, the lock arm 32 is swung to engage the most suitably positioned aperture 30, and of course the lever 14 will be held in its position notwithstanding the normal expansive tendency of the rim, as exerted upon the arms of the tire tool, so that the operator is free to place or remove the tire with respect to the rim while in its contracted condition. After having placed a tire upon a rim, the latter is expanded by moving the operating lever 14 away from the V-shaped frame or member 10, and which, of course, moves the clamps of the member 10 relatively away from the clamp 37 of the link arm 20. This expanding operation so moves the jaws 37, that the plates or supporting portions 38 thereof directly engage the inner periphery of the rim to effect the expanding operation. This is permitted, notwithstanding the U-shaped formation of said jaws 37, incident to the pivoting of the sides 41 of each of said jaws, as it is obvious that as the rim is expanded, the sides 41 of the jaws 37 will open to permit such operation.

From the foregoing description of this invention, it is apparent that a rim tool has been provided, which is of a very practical nature, embodying features which render the expansion or contraction of the rim very easy, and the placing or removing of the tire with respect thereto relatively simple. The cross member 35 serves a dual function, in maintaining the frame arms 11 and 12 in proper relation, and also serves as a pivotal support for the latch member 32. It is also to be noted that the socket member 45 reinforces the jaw 37 upon which it is carried, which is of importance in that this jaw receives more strain than any of the other jaws carried by the improved rim expanding and contracting tool.

Various changes in the shape, size and arrangement of parts may be made to the form of invention herein shown and described, without departing from the spirit of this invention or the scope of this claim.

I claim:

A rim tool comprising a lever having an opening in one end, a bar pivotally connected with said lever in spaced relation to the opening in the end thereof, the lever between the said opening and bar being provided with latch receiving openings, a V-shaped member formed of a bar passed through the opening in the end of said lever and bent to provide arms extending in diverging relation, a latch having one end provided with an eye and the other end with a bill, a rod passing through said eye and having its ends secured to the arms of said V-shaped member intermediate the length thereof to brace the arms and pivotally and slidably mount the latch for movement into and out of position for passage of the bill thereof through a selected latch receiving opening of said lever, and rim engaging members carried by the outer ends of said bar and arms.

FRANK SKATULSKI.